US009523574B2

(12) United States Patent
Chiba et al.

(10) Patent No.: US 9,523,574 B2
(45) Date of Patent: Dec. 20, 2016

(54) SURVEYING INSTRUMENT

(71) Applicant: Kabushiki Kaisha TOPCON, Tokyo (JP)

(72) Inventors: Minoru Chiba, Tokyo (JP); Yosuke Okudaira, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 197 days.

(21) Appl. No.: 14/466,351

(22) Filed: Aug. 22, 2014

(65) Prior Publication Data
US 2015/0052766 A1    Feb. 26, 2015

(30) Foreign Application Priority Data

Aug. 23, 2013   (JP) ................ 2013-173521

(51) Int. Cl.
*G01C 15/00* (2006.01)
*G01C 3/00* (2006.01)

(52) U.S. Cl.
CPC ............... *G01C 15/002* (2013.01); *G01C 3/00* (2013.01)

(58) Field of Classification Search
CPC ..... G01C 15/004; G01C 15/00; G01C 15/002; G01C 15/006; G01C 15/12
USPC .................................... 33/299, 290
See application file for complete search history.

(56) References Cited

U.S. PATENT DOCUMENTS

| 3,790,277 | A | * | 2/1974 | Hogan | ............ | G01C 15/004 |
| | | | | | | 356/139.06 |
| 5,294,970 | A | * | 3/1994 | Dornbusch | ......... | G01C 15/002 |
| | | | | | | 356/141.1 |
| 5,898,490 | A | * | 4/1999 | Ohtomo | ............ | G01C 15/004 |
| | | | | | | 356/141.1 |
| 6,023,326 | A | | 2/2000 | Katayama et al. | | |
| 6,046,800 | A | * | 4/2000 | Ohtomo | ............ | G01C 15/002 |
| | | | | | | 356/139.07 |
| 6,622,391 | B1 | * | 9/2003 | Shirai | ............... | G01C 1/02 |
| | | | | | | 33/1 PT |

(Continued)

FOREIGN PATENT DOCUMENTS

| CN | 1648602 A | 8/2005 |
| CN | 101539423 A | 9/2009 |

(Continued)

OTHER PUBLICATIONS

The extended European search report issued by the European Patent Office on Feb. 4, 2015, which corresponds to European Patent Application No. 14182003.5-1557 and is related to U.S. Appl. No. 14/466,351.

(Continued)

*Primary Examiner* — Christopher Fulton
(74) *Attorney, Agent, or Firm* — Studebaker & Brackett PC

(57) ABSTRACT

A surveying instrument includes a main body including a base and a pedestal rotating in a horizontal direction relative to the base, and a cover member which covers the main body, wherein the pedestal is provided with a support member which supports a lens barrel of a ranging optical system to be rotatable in a vertical direction, and the cover member covers the support member of the pedestal, the lens barrel, and a guide light irradiation unit which irradiates with guide light indicating a collimation direction of the main body to an operator.

2 Claims, 8 Drawing Sheets

(56) References Cited

U.S. PATENT DOCUMENTS

| | | | | |
|---|---|---|---|---|
| 6,675,489 | B2* | 1/2004 | Ohtomo | G01C 9/06 |
| | | | | 250/559.3 |
| 7,214,917 | B2* | 5/2007 | Ohtomo | G01C 15/002 |
| | | | | 250/206.1 |
| 7,591,075 | B2* | 9/2009 | McCracken | G01C 15/004 |
| | | | | 33/281 |
| 9,273,960 | B2* | 3/2016 | Kumagai | G01C 15/002 |
| 2004/0246498 | A1* | 12/2004 | Kumagai | G01C 15/002 |
| | | | | 356/614 |
| 2005/0189469 | A1 | 9/2005 | Sugiura | |
| 2009/0235543 | A1 | 9/2009 | Hayashi et al. | |
| 2009/0241358 | A1 | 10/2009 | Ohtomo et al. | |
| 2012/0212588 | A1 | 8/2012 | Ohtomo et al. | |
| 2012/0242830 | A1 | 9/2012 | Kumagai et al. | |

FOREIGN PATENT DOCUMENTS

| | | |
|---|---|---|
| CN | 101663561 A | 3/2010 |
| CN | 102645180 A | 8/2012 |
| EP | 2503284 A2 | 9/2012 |
| JP | H10-332371 A | 12/1998 |
| JP | 2012-026894 A | 2/2012 |
| JP | 2012-202821 A | 10/2012 |

OTHER PUBLICATIONS

The extended European search report issued by the European Patent Office on Jan. 23, 2015, which corresponds to European Patent Application No. 14182011.8-1557 and is related to U.S. Appl. Nos. 14/466,351 and 14/466,378.

TOPCON; "TOPCON ES Series Reflectorless Total Stations"; XP055164738; "URL:http://www.topconpositioning.com/sites/default/files/Topcon_ES_Series_Brochure_A_US_US_Low.pdr"; Aug. 8, 2012.

An Office Action issued by the Chinese Patent Office on Mar. 28, 2016, which corresponds to Chinese Patent Application No. 201410399886.1 and is related to U.S. Appl. Nos. 14/466,351 and 14/466,378.

The first Office Action issued by the Chinese Patent Office on May 23, 2016, which corresponds to Chinese Patent Application No. 201410400032.0 and is related to U.S. Appl. Nos. 14/466,351 and 14/466,378.

\* cited by examiner

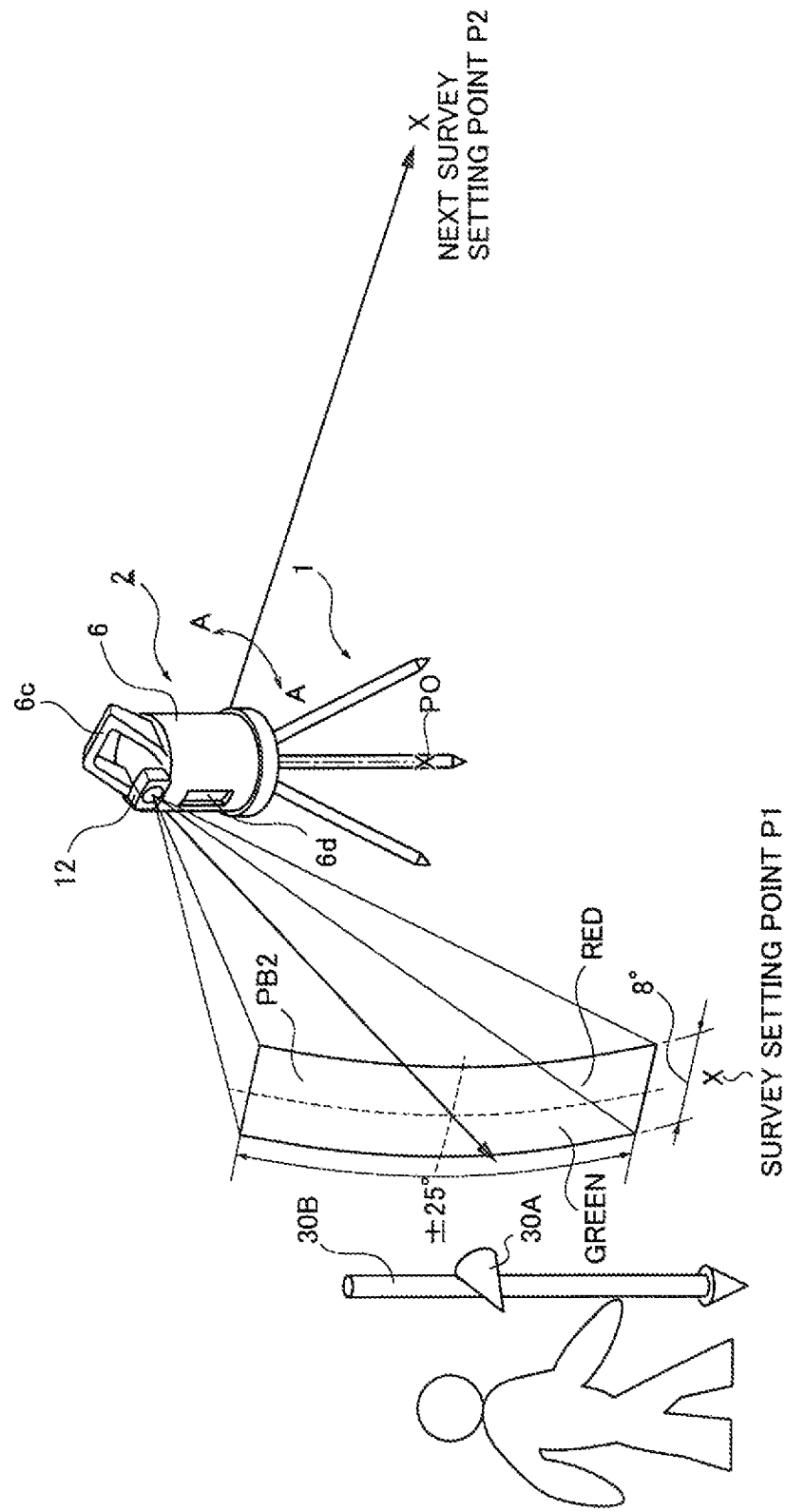

OPTICAL PATH IN HORIZONTAL DIRECTION AS SEEN FROM TOP

OPTICAL PATH IN VERTICAL DIRECTION AS SEEN FROM SIDE

SURVEYING INSTRUMENT

PRIORITY CLAIM

The present application is based on and claims priority from Japanese Patent Application No. 2013-173521, filed on Aug. 23, 2013, the disclosure of which is hereby incorporated by reference in its entirety.

BACKGROUND

1. Field of the Invention

The present invention relates to a surveying instrument including a guide light optical system which irradiates with guide light.

2. Description of the Related Art

A surveying instrument provided with a guide light irradiation unit which irradiates with guide light indicating a collimation direction of a surveying instrument to an operator is conventionally known (refer to, for example, JP2012-202821A).

Such a surveying instrument includes a base and a pedestal rotating in a horizontal direction relative to the base. The pedestal is provided with a support member. The support member supports a lens barrel of a ranging optical system to be rotatable in a vertical direction, and is provided with various driving mechanisms and control mechanisms.

A cover member is attached to the pedestal to cover the support member and the lens barrel of the ranging optical system as well as respective mechanisms. The guide light irradiation unit is provided in the top part of the cover member.

However, since the guide light irradiation unit is provided in the cover member in the conventional surveying instrument, it is necessary to adjust the optical axis of the guide light irradiation unit relative to the optical axis of the lens barrel when the cover member is attached to the pedestal.

For this reason, complex adjustment is required when the cover member is reattached to the pedestal after maintenance which requires the removal of the cover member.

SUMMARY

The present invention has been made in view of the above circumstances, and an object of the present invention is to provide a surveying instrument capable of simply attaching a cover member to a pedestal.

To attain the above object, one embodiment of the present invention provides a surveying instrument, including: a main body including a base and a pedestal rotating in a horizontal direction relative to the base, and a cover member which covers the main body, wherein the pedestal is provided with a support member which supports a lens barrel of a ranging optical system to be rotatable in a vertical direction, and the cover member covers the support member of the pedestal, the lens barrel, and a guide light irradiation unit which irradiates with guide light indicating a collimation direction of the main body to an operator.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 8 is a view illustrating one example of a surveying operation by an operator.

DESCRIPTION OF THE PREFERRED EMBODIMENT

Embodiment

Hereinafter, an embodiment of a surveying instrument according to the present invention will be described with reference to the drawings.

(Configuration of Surveying Instrument)

Figure 1:
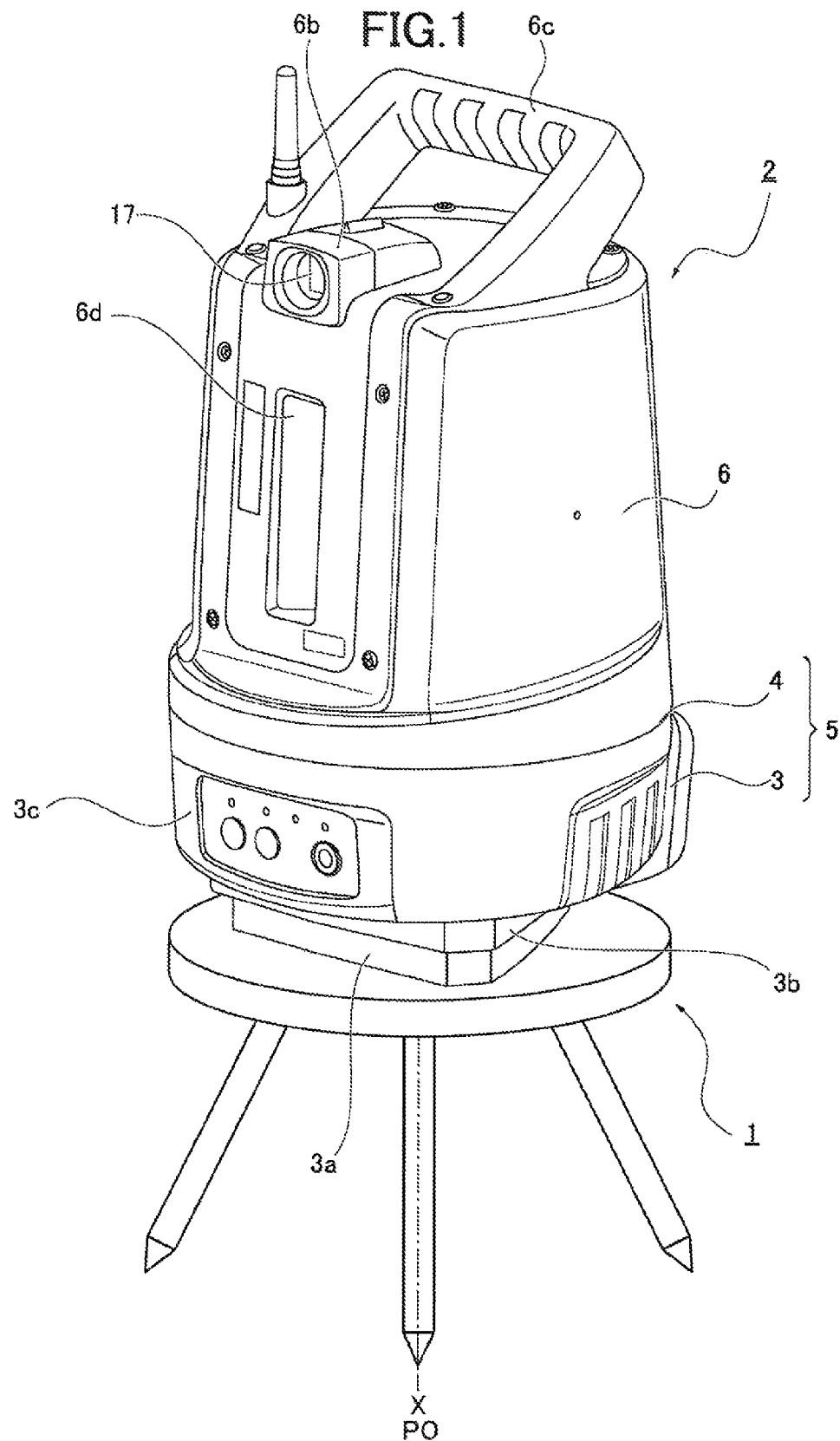
FIG. 1 is a perspective view illustrating a general configuration of a surveying instrument according to an embodiment of the present invention.
Figure 2:
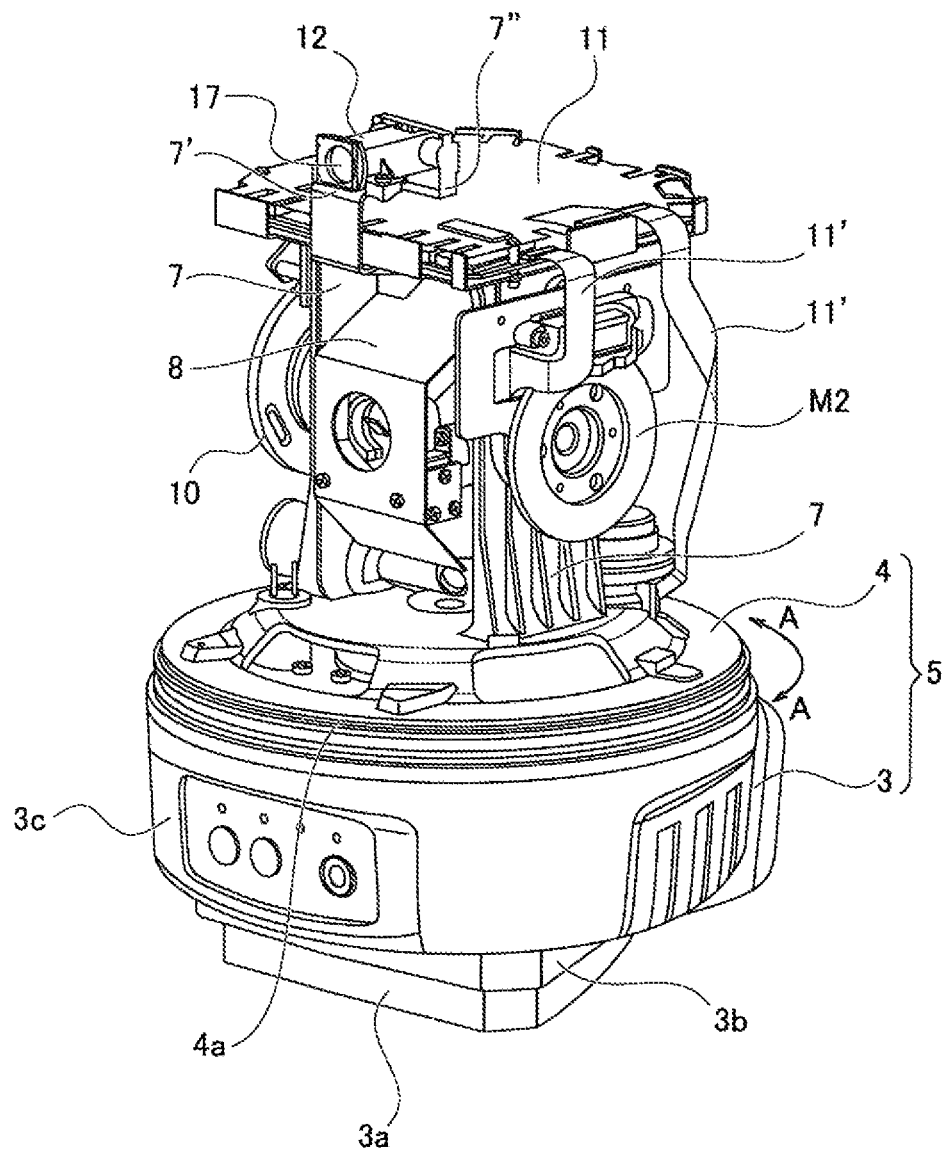
FIG. 2 is a schematic view illustrating an inside configuration of a surveying instrument according to the embodiment of the present invention.

Referring to FIG. 1, reference number 1 denotes a tripod and reference number 2 denotes a surveying instrument. The surveying instrument 2 includes a main body 5 having a base 3 and a pedestal 4 rotating in a horizontal direction relative to the base 3, as illustrated in FIG. 2, and a cover member 6, as illustrated in FIG. 1. In addition, the surveying instrument 2 is placed in a known point P0.

The base 3 includes a seat 3a fixed to the tripod 1, a leveling base 3b having a not-shown leveling screw, and a case 3c having inside thereof a driving mechanism such as a horizontal direction-driving motor M1 (refer to FIG. 4) which rotates and drives the pedestal 4 in a horizontal direction (arrow A direction, as illustrated in FIG. 2).

Figure 3:
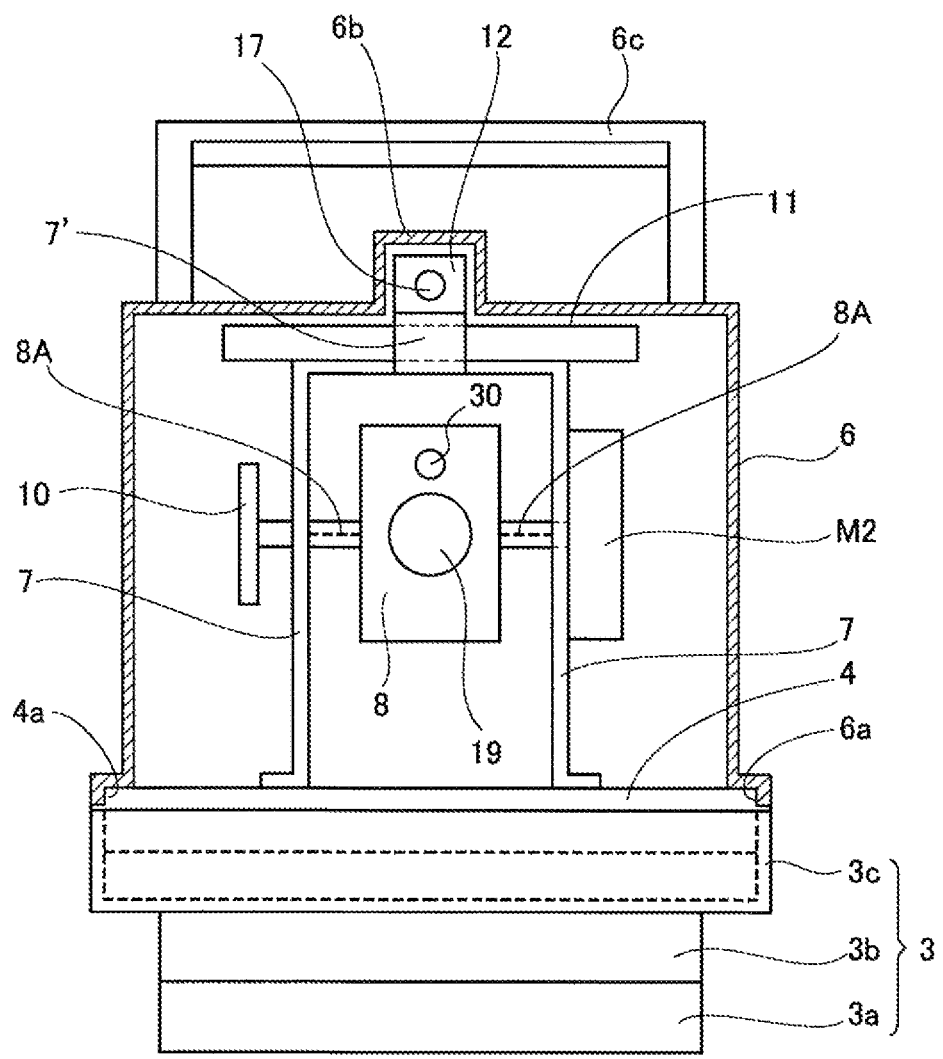
FIG. 3 is a view illustrating a relationship between a cover member and a main body of the surveying instrument according to the embodiment of the present invention.

The pedestal 4 is provided with a support member 7, as illustrated in FIGS. 2, 3. The support member 7 is provided with a horizontal axis 8A, 8A which supports a lens barrel 8 of a ranging optical system and a tracking optical system to be rotatable in a vertical direction, as illustrated in FIG. 3.

A vertical direction-driving motor M2 which rotates and drives the lens barrel 8 in a vertical direction is fixed to one end portion of the horizontal axis 8A. An encoder 10 which detects a rotation angle of the lens barrel 8 is provided in the other end portion of the horizontal axis 8A.

A control circuit board 11, which controls the rotation of the pedestal 4 in a horizontal direction and the rotation of the lens barrel 8 in a vertical direction, and a guide light irradiation unit 12 are fixed to the upper end portion of the support member 7.

In this case, the guide light irradiation unit 12 is supported by standing plates 7', 7" cut and rising from the upper end portion of the support member 7. A through-hole through which the standing plate 7" penetrates is formed in the control circuit board 11.

The horizontal direction-driving motor M1, vertical direction-driving motor M2, encoder 10, and the like are connected by a flexible print circuit 11', as illustrated in FIG. 2. The control circuit board 11 is provided with an after-described CPU.

The guide light irradiation unit 12 is used for indicating the collimation direction of the main body 5 of the surveying instrument to an operator.

As illustrated in FIG. 3, the cover member 6 includes an opening 6a into which an outer circumference portion 4a of the pedestal 4 is fitted, a cover 6b which covers the guide light irradiation unit 12, a handle 6c, and a window 6d extending in an up and down direction, as illustrated in FIG. 1. In addition, the outer circumference portion 4a of the pedestal 4 is provided with a not-shown seal member for preventing the entrance of rainwater or the like.

A space is formed between the cover member 6 and the guide light irradiation unit 12, and a space is also formed between the cover member 6 and the control circuit board 11. With this configuration, the cover member 6 is prevented from having contact with the guide light irradiation unit 12 when attaching and detaching the cover member 6.

Moreover, even when an impact is applied to the cover member 6 from the outside, the influence on the inside control circuit and the guide light irradiation unit 12 can be prevented as much as possible.

Figure 4:
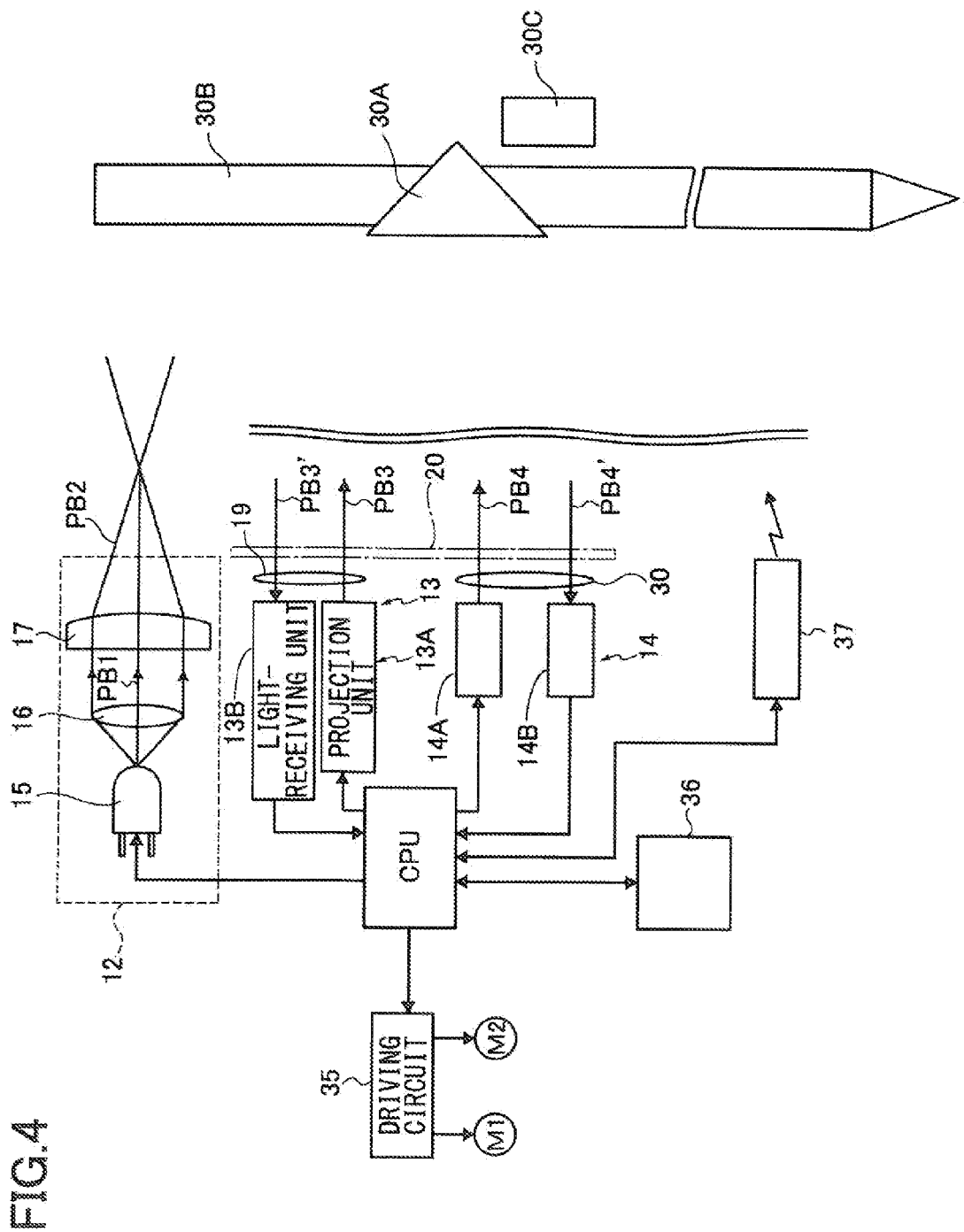
FIG. 4 is a block circuit diagram illustrating a configuration of an optical system of the surveying instrument illustrated in FIGS. 1, 2.

The lens barrel 8 is provided with a ranging optical system 13 and a tracking optical system 14, as illustrated in FIG. 4. An inclination angle of the optical axis of the optical system of the lens barrel 8 is obtained by using the encoder 10. Before describing the ranging optical system 13 and the tracking optical system 14, the optical system of the guide light irradiation unit 12 will be described.

(Configuration of Optical System of Guide Light Irradiation Unit 12)

Figure 5:
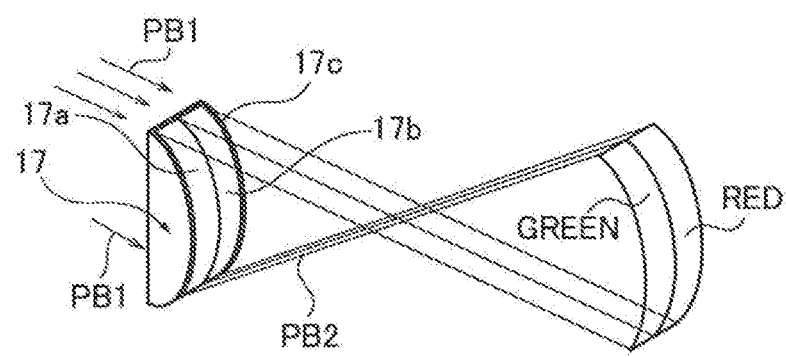
FIG. 5 is a view illustrating one example of a cylindrical lens illustrated in FIG. 4.

The guide light irradiation unit 12 includes, as illustrated in FIG. 4, for example, a laser light source 15, collimator lens 16, and cylindrical lens 17, as illustrated in FIG. 5. The laser light source 15 generates visible white laser light.

The collimator lens 16 converts the visible white laser light into a parallel light beam PB1. The cylindrical lens 17 converts the parallel light beam PB1 into fan-like guide light PB2 extending in a vertical up and down direction.

A slit filter 17a which extends in a direction having a power, and transmits green light and a slit filter 17b which extends in a direction having a power, and transmits red light are formed in the cylindrical lens 17, as illustrated in FIG. 5. Reference number 17c is a slit mask.

The laser light source 15 is controlled by a CPU as a control circuit, as illustrated in FIG. 4, and starts emitting upon the turning on of a not-shown power source switch.

(Configuration of Ranging Optical System 13)

Figure 6:
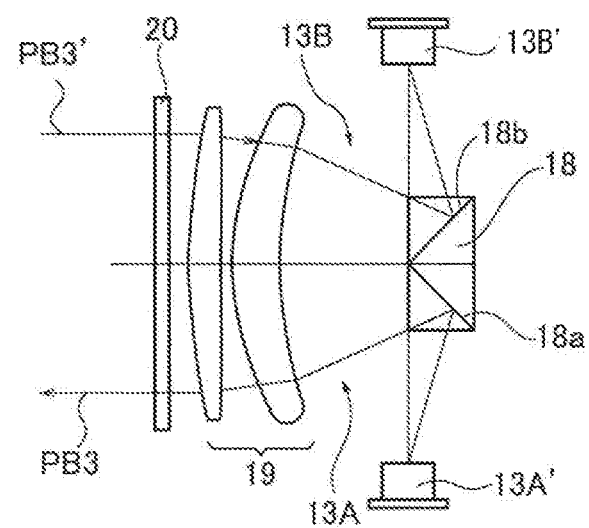
FIG. 6 is an optical view illustrating one example of a ranging optical system illustrated in FIG. 4.

The ranging optical system 13 includes a projection unit 13A and a light-receiving unit 13B, as illustrated in FIG. 4. The projection unit 13A includes a light source 13A', as illustrated in FIG. 6, and the light-receiving unit 13B includes a light-receiving element 13B'.

The light source 13A' emits an infrared laser beam. The infrared laser beam is reflected by the dichroic mirror surface 18a of the beam splitter 18 toward an objective lens 19, and is emitted as a parallel light beam PB3 from the lens barrel 8 through a cover glass 20.

The parallel light beam PB3 is reflected by a corner cube (target) 30A, as illustrated in FIG. 4, returns to the objective lens 19 through the cover glass 20 as a reflection light beam PB3', is reflected by the dichroic mirror surface 18b of the beam splitter 18, and is converged in the light-receiving element 13B'.

The output of the light-receiving element 13B' is input to a calculator of the CPU provided in the control circuit board 11. The CPU calculates a distance to the corner cube 30A based on the output of the light-receiving element 13B'. The corner cube 30A is fixed to a surveying pole 30B which is carried by an operator.

(Configuration of Tracking Optical System 14)

Figure 7:
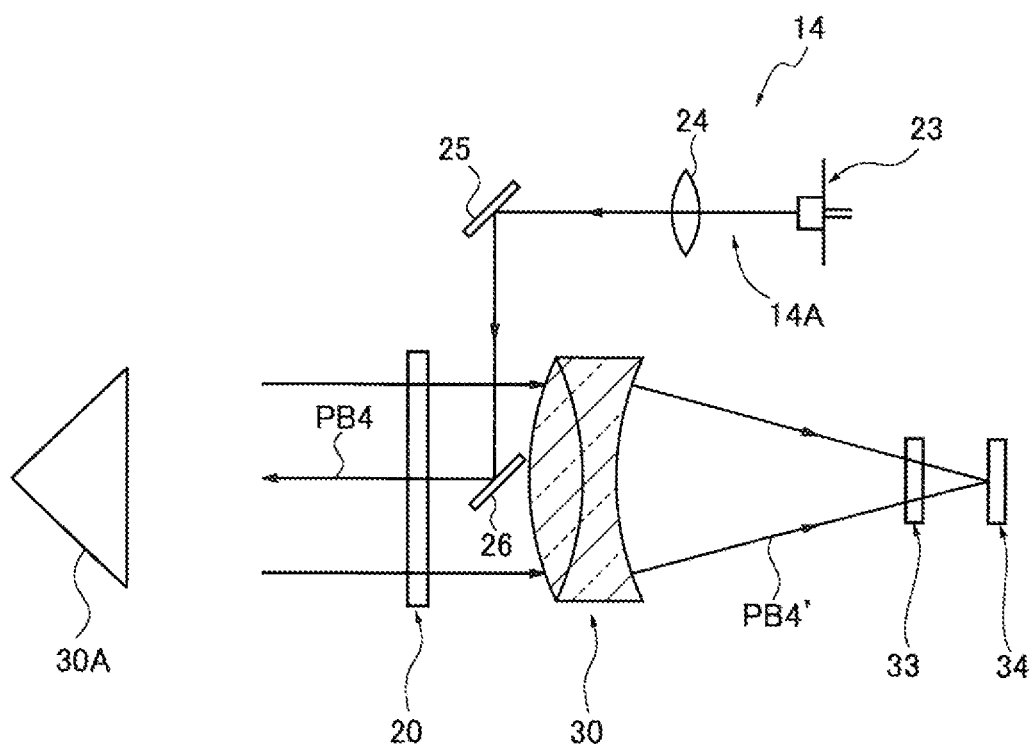
FIG. 7 is an optical view illustrating one example of a tracking optical system illustrated in FIG. 4.

The tracking optical system 14 is used to lock the corner cube 30A. The tracking optical system 14 includes a laser diode 23, collimator lens 24, reflection mirrors 25, 26, objective lens 30, cover glass 20, light noise eliminating filter 33, and light-receiving element 34, as illustrated in FIG. 7.

The laser diode 23, collimator lens 24, and reflection mirrors 25, 26 constitute the projection unit 14A. The objective lens 30, light noise eliminating filter 33, and light-receiving element 34 constitute the light-receiving element 14B.

The laser diode 23 emits as tracking light infrared laser light PB4 having a wavelength different from a wavelength of the ranging light of the ranging optical system 13. The infrared laser light PB4 is changed into an approximately parallel light beam by the collimator lens 24.

The infrared laser light PB4 reflected by the reflection mirrors 25, 26 is emitted outside the surveying instrument 2, and the searching and scanning of the corner cube 30A are performed by the infrared laser light PB4. When the corner cube 30A is located in the searching range, the infrared laser light PB4 is reflected by the corner cube 30A, and returns to the objective lens 30.

The reflection light PB4' of the infrared laser light PB4 is converged by the objective lens 30, and is imaged on the light-receiving element 34 through the light noise eliminating filter 33. The light noise eliminating filter 33 performs an operation which transmits light having a wavelength which is the same as that of the infrared laser beam.

(Configuration of Driver)

The surveying instrument 2 includes a driving circuit 35 as illustrated in FIG. 4. The horizontal direction-driving motor M1 and the vertical direction-driving motor M2 are connected to the driving circuit 35.

The driving circuit 35 is controlled by the CPU, and performs an operation which outputs a rotation permission signal of the horizontal direction-driving motor M1 to the driving circuit 35 when a wireless transmitting and receiving unit 37 receives a lens barrel rotation permission signal.

The CPU calculates the rotation angle to a next survey setting point P2 in a horizontal direction from the present angle to which the lens barrel 8 of the surveying instrument 2 faces in a horizontal direction by a standard orientation signal and the lens barrel rotation permission signal.

More specifically, a next irradiation direction with the guide light PB2 is obtained by the calculation from the direction that the surveying instrument 2 irradiates with the guide light PB2 (direction that survey setting point P1 exists as illustrated in FIG. 8). The lens barrel 8 thereby rotates in a horizontal direction toward the direction that the after-described next survey setting point P2 exists, and the rotation is stopped in this position.

(One Example of Operation of CPU)

The CPU includes an operation which outputs a rotation permission signal of the vertical direction-driving motor M2 to the driving circuit 35 when the rotation of the lens barrel 8 stops in the direction of the next survey setting point P2.

The driving circuit 35 includes an operation which alternatively forward-rotates and reverse-rotates the vertical direction-driving motor M2. With this operation, the infrared laser light PB4 scans in an up and down direction in the next survey setting point P2.

An operator moves in a direction that the survey setting point P1 is located with the target of the guide light PB2, as illustrated in FIG. 8. Then, the operator sees the guide light PB2 made of red light and green light.

When the surveying pole 30B is stood in that position, the corner cube 30A is locked by the tracking optical system 14. When the pole 30B is located in the survey setting point P1, ranging to the corner cube 30A or ranging to the corner cube 30A and ranging angle is executed.

Next, the CPU obtains the distance to the corner cube 30A or the distance and the angle (three dimensional coordinate) by calculation. The distance data from the present corner cube 30A to the surveying instrument 2 or the distance data and the angle data (three dimensional coordinate) is once stored in the storing unit 36 as measurement data.

The surveying instrument 2 includes the storing unit 36 and the wireless transmitting and receiving unit 37, as illustrated in FIG. 4. The storing unit 36 and the wireless transmitting and receiving unit 37 are connected to the CPU.

The wireless transmitting and receiving unit 37 performs an operation which sends the present position of an operator (distance data from surveying instrument 2 to corner cube 30A or distance data and angle data (three dimensional coordinate)) to a portable wireless transmitting and receiving unit 30C.

The CPU determines that the corner cube 30A is locked, turns off the guide light PB2 while the corner cube 30A is locked, and turns on the guide light PB2 again when the corner cube 30A is unlocked during the operation.

According to the embodiment, the cover member 6 engages with the outer circumference portion 4a of the pedestal 4, so that the cover member 6 can be mounted on the main body 5 of the surveying instrument. Thus, the attachment and detachment can be easily performed.

A space is provided between the cover member 6 and the guide light irradiation unit 12 and between the cover member 6 and the control circuit board 11. With this space, even when an impact is applied to the cover member 6 from the outside, the influence on the inside control circuit and the guide light irradiation unit 12 can be prevented as much as possible.

Moreover, since the main body 5 is covered by the cover member 6, direct daylight to the support member 7 can be prevented, and the inclination of the horizontal axis 8A, 8A due to the partial heat expansion of the support member 7 can be prevented.

Modified Example

Figure 9A:
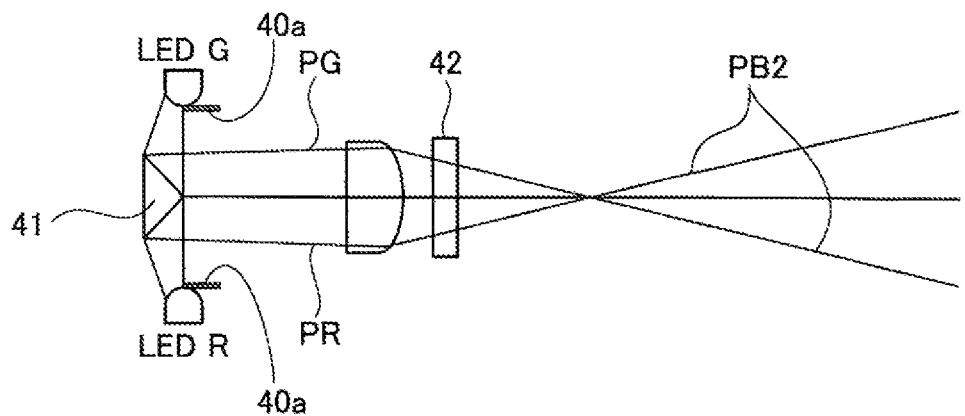
FIG. 9A is a view illustrating a modified example of a guide light irradiation unit according to the embodiment of the present invention, and illustrating an optical path as seen from the top.
Figure 9B:
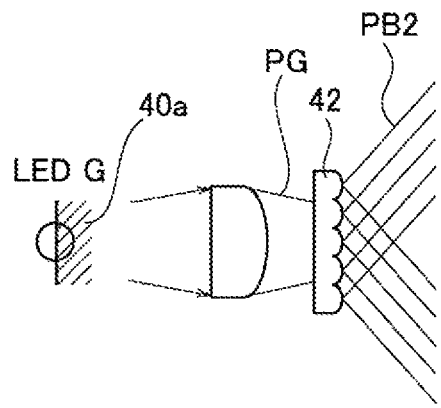
FIG. 9B is a view illustrating the optical path of the guide light irradiation unit illustrated in FIG. 9A as seen from the side.

FIGS. 9A, 9B are views illustrating a modified example of the guide light irradiation unit 12. In this modified example, the guide light irradiation unit 12 includes a light-emitting diode LED G which generates green light PG and a light-emitting diode LED R which generates red light PR, as illustrated in FIG. 9A.

Aperture stop members 40a, 40b are provided just in front of the light-emitting diode LED G and the light-emitting diode LED R, respectively. Each of the aperture stop members 40a, 40b is configured to cut half of each light.

The green light PG and the red light RG are reflected by a mirror prism 41, and are guided to a lenticular lens 42.

The green light PG and the red light RG are emitted from the guide light irradiation unit 12 as the fan-like guide light PB2.

In addition, in this embodiment, the objective lens 30 of the tracking optical system 14 and the objective lens 19 of the ranging optical system 13 are separated. However, the objective lens 30 of the tracking optical system 14 and the objective lens 19 of the ranging optical system 13 may be integrated.

According to the embodiment of the present invention, the cover member can be attached to the pedestal without requiring a complex adjustment operation which aligns the optical axis of the guide light irradiation unit with the optical axis of the lens barrel in a horizontal direction.

Although the embodiment of the present invention has been described above, the present invention is not limited thereto. It should be appreciated that variations may be made in the embodiment described by persons skilled in the art without departing from the scope of the present invention.

What is claimed is:

1. A surveying instrument, comprising:
    a main body including a base and a pedestal rotating in a horizontal direction relative to the base, and
    a cover member which covers the main body, wherein
    the pedestal is provided with a support member which supports a lens barrel of a ranging optical system to be rotatable in a vertical direction, and
    the cover member covers the support member of the pedestal, the lens barrel, and a guide light irradiation unit which irradiates with guide light indicating a collimation direction of the main body to an operator.

2. The surveying instrument according to claim 1, wherein the cover member includes an opening into which the pedestal is fitted and a covering portion which covers the guide light irradiation unit.

* * * * *